United States Patent [19]

Moriyama

[11] 4,282,469

[45] Aug. 4, 1981

[54] POSITIONING CONTROL SYSTEM

[75] Inventor: Shigeo Moriyama, Hachioji, Japan

[73] Assignee: Hitachi, Ltd., Tokyo, Japan

[21] Appl. No.: 115,410

[22] Filed: Jan. 25, 1980

[30] Foreign Application Priority Data

Feb. 7, 1979 [JP] Japan .................................. 54-12273

[51] Int. Cl.³ .............................................. G05B 5/01
[52] U.S. Cl. .................................... 318/619; 318/618; 318/640
[58] Field of Search ............... 318/619, 620, 616, 618, 318/640

[56] References Cited

U.S. PATENT DOCUMENTS 3,644,720  2/1972  Falk ........................................ 318/619
4,051,423  9/1977  Touchton et al. ..................... 318/619

Primary Examiner—Stanley J. Witkowski
Assistant Examiner—Eugene S. Indyk
Attorney, Agent, or Firm—Craig and Antonelli

[57] ABSTRACT

In a positioning control system of the type which controls an object to be controlled to a target position by the use of a servo system, the present invention is characterized in that when a position deviation between the present position of the object to be controlled and the desired target position is smaller than a predetermined value, the servo system is actuated for a first period of time in accordance with the position deviation by means of a control signal which is greater than that normally warranted by the position feedback gain which is provided in the servo system, and is thereafter changed over to a servo system which is actuated by the position feedback gain either after a predetermined time or when a predetermined velocity has been achieved.

11 Claims, 5 Drawing Figures

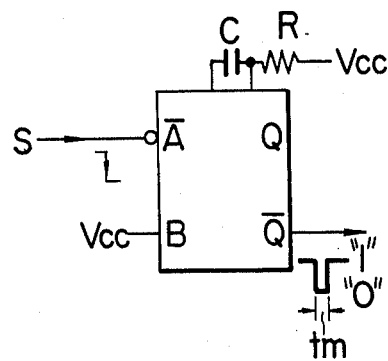
FIG. 3
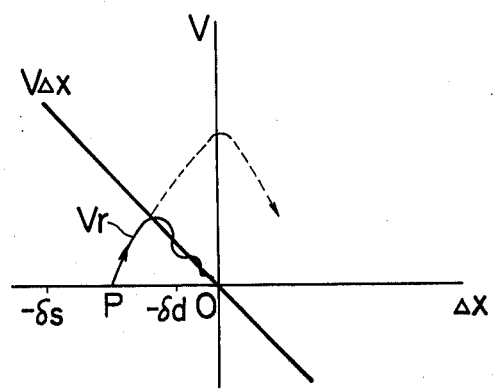
FIG. 4
FIG. 5
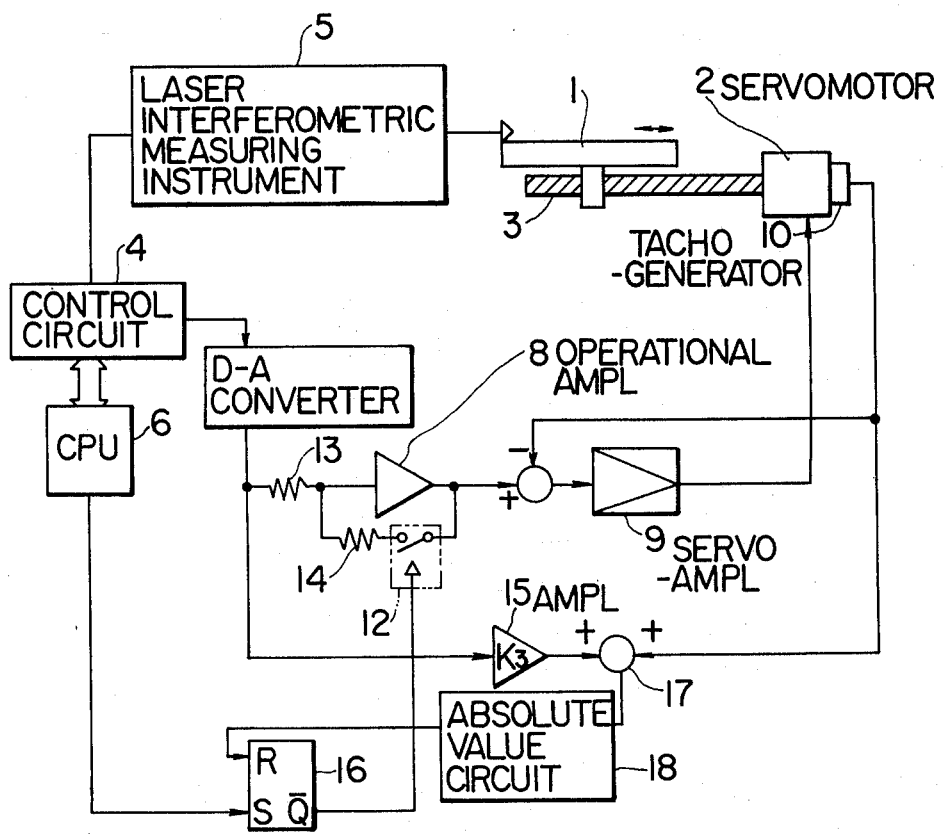

POSITIONING CONTROL SYSTEM

BACKGROUND OF THE INVENTION

This invention relates to a positioning control system for use in positioning of an object to be controlled, e.g., a sample-mounting movable table or stage employed in a step-and-repeat camera or a step-and-repeat projection printing apparatus, wherein positioning is accomplished by means of closed loop control.

An X-Y movable table for positioning a glass substrate or a wafer at a high speed with a high level of accuracy has been used in a step-and-repeat camera for producing a photomask or in a step-and-repeat projection printing apparatus used in the production of a semiconductor integrated circuit which directly projects and exposes a circuit pattern from a reticle onto a wafer without using a photomask of the original size. In such a movable table, positioning accuracy of about 1 $\mu$m is required for a moving range of about $150 \times 150$ mm$^2$.

In the conventional movable table system of this kind which effects precision positioning, use is made of a closed loop linear position control comprising a position detecting system using laser interferometric measurement, a circuit for computing deviation of the movable table from a desired position and a driving system consisting of a servo motor and a feed screw. Such a system is disclosed, for example, in U.S. Pat. No. 3,539,256, as well as The Bell System Technical Journal, Vol. 49, November 1970, No. 9, pages 2145–2177.

In this closed loop linear position control, the smaller the deviation $\Delta X$ of the movable table from the desired position, the smaller is the output torque Tm of the servo motor required to position the table accurately, as shown in FIG. 1. Accordingly, there is a region in which control is impossible because the guide means of the movable table and the feed screw experience friction, and the inertia of the system counterbalances or absorbes the torque required for fine adjustment. Namely, in FIG. 1, if the frictional force is equal or greater than the torque Td of the motor shaft, control is impossible within $\pm \delta d$ of a target value when the position feedback gain is $K_1$. This remains as a positioning error. If the position feedback gain is increased to a value such as $K_2$ in order to reduce this positioning error, the control system becomes unstable and hunting or oscillation takes place. Hence, the position feedback gain cannot be increased beyond a certain limit.

There is another method which minimizes the equivalent torque Td of the frictional force, or which interposes a reduction gear system between the motor shaft and the feed screw. This method, however, results in a degradation of high speed characteristics.

As explained above, the positioning error is proportional to the magnitude of the frictional force of the guide means of the movable table and to that of the feed screw. Generally, the magnitude of the frictional force depends on the frictional speed and the static coefficient of friction reaches 2 to 5 times the coefficient of kinetic friction. In FIG. 1, when the static coefficient of friction converted equivalently into the servo motor shaft is Ts, the servo motor is unable to rotate within $\pm \delta s$ if the position feedback gain is $K_1$. In other words, the servo motor does not start from the condition of the deviation $\Delta x < \delta s$. This indicates that, when the feed distance of the movable table is large, linear position control is effected under the state of the kinetic friction, so that the positioning is possible within $\pm \delta s$ of the desired target position; whereas, when the feed distance is less than $\delta s$, the position control is not started so that the feed distance appears as a positioning career.

SUMMARY OF THE INVENTION

The present invention is directed to a solution of the above-mentioned problem, and seeks to provide a positioning control system for effecting positioning of an object to be controlled, such as a movable table, by means of closed loop control, said positioning control system making it possible to improve the accuracy of positioning especially in the case where the positioning control is started from the state where the present position of the movable table is close to the target value.

To accomplish the above-mentioned object, when the feed distance is within $\pm \delta s$, the present invention feeds to a motor driving circuit such a signal as will permit the servo motor to start rotating, or such a signal as will allow it to generate a torque greater than Ts in FIG. 1, actuates the motor in this manner thereby to bring the above-mentioned friction into the state of kinetic friction, and thereafter removes this signal to effect linear positioning control.

BRIEF DESCRIPTION OF THE DRAWINGS

FIG. 3 is a block diagram showing an example of a switch control circuit;

FIG. 4 is a diagram showing the characteristics in accordance with the present invention; and FIG. 5 is a block diagram showing another embodiment of the present invention.

DETAILED DESCRIPTION OF THE PREFERRED EMBODIMENTS

Hereinafter, the present invention will be explained in further detail with reference to preferred embodiments thereof.

Figure 2:
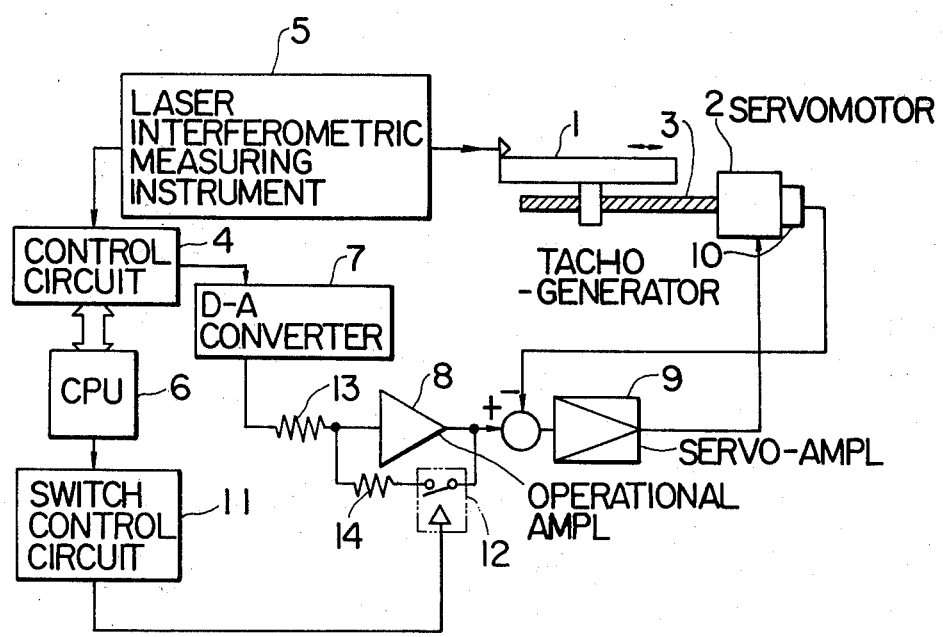
FIG. 2 is a block diagram showing an embodiment of the present invention.

FIG. 2 is a block diagram showing an embodiment of the present invention. A movable table 1 is driven, for example, by a D.C. servo motor 2 and a ball screw 3. A control circuit 4 digitally calculates the deviation between the position of the movable table 1, which is detected by a laser interferometric measuring instrument 5, and the desired target position instructed by a computer 6. The result of the calculation rotates the D.C. servo motor 2 in such a direction as will diminish the result of the calculation. In this regard, a control signal is applied via a digital-to-analog converter 7, an operational amplifier 8 and a servo amplifier 9. A tachogenerator 10 is employed to stabilize this linear position control system.

Reference numeral 11 denotes a switch control circuit which is actuated by a digital signal from the converter 6 and is composed of a monostable multi-vibrator or the like. FIG. 3 shows an example of the control circuit 11. When a signal S, an input signal from the computer 6 to the switch control circuit 11, changes from logic "1" to logic "0", the output signal $\overline{Q}$ of this circuit becomes logic "0" for the period $t_m$ which is determined by a capacitor C and a resistor R, whereby the circuit 11 opens an analog switch 12 and raises the voltage gain of the operational amplifier to a value near infinity. When the input signal S is at logic "1", the output signal $\overline{Q}$ remains at "1", whereby the analog switch 12 is closed, thereby providing the operational amplifier 8 with a gain $k_3$ which is determined by resistors 13 and 14.

Figure 1:
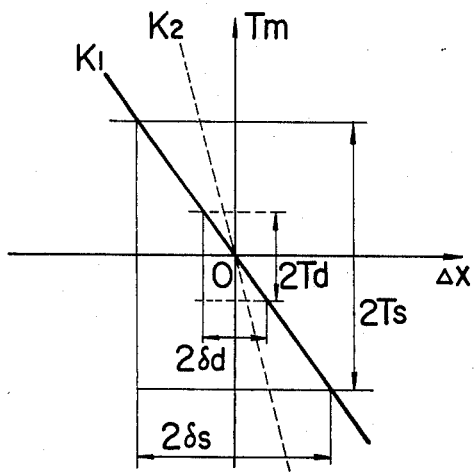
FIG. 1 is a diagram useful for explaining the general characteristics of closed loop positioning control.

The computer 6 calculates the position deviation $\Delta x$ between the desired target position to which the movable table 1 is to be moved and its present position, and compares $|\Delta x|$ with the predetermined position deviation $|\delta s|$ within which the servo motor 2 is unable to start for the afore-mentioned reason. When $|\Delta x| > |\delta s|$, the computer 6 sends a signal S at logic "1" to the switch control circuit 11, which closes the analog switch 12 and provides the operational amplifier 8 with the gain $k_3$. Thereafter, the computer 6 transmits to the control circuit 6 the target position to which the movable table 1 is to be moved, and actuates the linear position control. The gain $k_3$ of this operational amplifier 8 is set to the maximum value within a range in which the linear position control is stable, enlarges the gradient of $K_1$ in FIG. 1 as much as possible, and minimizes the locating error $\delta_d$.

If $|\Delta x| \leq |\delta s|$, on the other hand, the computer 6 sends a signal S at logic "0" to the switch control circuit 11, and after the gain of the operational amplifier 8 is made infinitely large, it initiates the control action in the same way as above. In this manner, a maximum allowable current is fed to the servo motor in a direction as will cause the movable table 1 to approach the target position and start moving against the static frictional torque. After the time $t_m$, the output $\overline{Q}$ of the switch control circuit 11 automatically goes to logic "1", thereby giving the gain $k_3$ to the operational amplifier 8 and ensuring stable linear control. The time $t_m$ is determined by the dynamic characteristics of the control system and may be selected in the manner to be described below.

In the linear position control system to which speed feedback is applied from the tachogenerator 10, such as shown in FIG. 4, the velocity V of the movable table 1 approaches the target value while it is being so controlled as to be proportional to the position deviation $\Delta s$. This relation is represented by $V\Delta x$. On the other hand, when the start is made from the above-mentioned condition $|\Delta x| \leq |\delta s|$, that is, from the point P in the drawing, the servo motor 2 approaches the target value with the maximum accelerating force as generated by Vr and if permitted as such, it moves on the trajectory indicated by the broken line in the drawing beyond the line $V\Delta x$, and goes beyond the target value until it finally causes oscillation. Accordingly, optimum control can be obtained by changing over the control system to linear control as soon as the trajectory Vr crosses the line $V\Delta x$. In other words, smooth control with the shortest control time becomes feasible by setting the time $t_m$ to the time from the start of the servo motor 2 till the point is reached when the velocity of the movable table 1 reaches the line $V\Delta x$. However, optimum control cannot always be obtained if the time $t_m$ is fixed, because the value $t_m$ varies depending on the magnitude of the position deviation $\Delta x$ before the start. In this embodiment, the setting of $t_m$ is so made that optimum control is realized when $\Delta x = (\delta s + \delta d)/2$. In this case, $t_m$ is about 2 ms.

In the embodiment described above, the control is automatically switched to linear control after the passage of the time $t_m$ from the start of the servo motor for the purpose of simplifying the circuit construction. This does not always ensure optimum control as also described above.

An embodiment which solves the above-mentioned problem will be explained with reference to FIG. 5. In place of the switch control circuit 11 in the above-mentioned embodiment, this embodiment additionally incorporates an amplifier 15 having the same gain $k_3$ as that of the operational amplifier 8 when the analog switch 12 is closed, an SR flip-flop 16, a comparator circuit 17 and an absolute value circuit 18. In the drawing, reference numerals 1 through 14 denote like constituent members as those in FIG. 2.

When the signal S of "0" level is sent from the computer 6 to the SR flip-flop 16, the output $\overline{Q}$ becomes "0" and the analog switch 12 is opened, whereby the servo motor 2 rotates at a speed on the trajectory Vr. Since the amplifier 15 has the gain $k_3$, its output signal is represented by the line $V\Delta x$ in FIG. 4. On the other hand, the output signal of the tachogenerator 10 represents the velocity V of the movable table 1. It is therefore possible to find the instant when the velocity V of the movable table becomes greater than the line $V\Delta x$ by comparing them with each other using the comparator 17. In other words, if the start is made when the position deviation $\Delta x$ is negative, the output of the comparator 17 reaches 0 at the above-mentioned instant from $-1$ and further shifts to $+1$. Accordingly, by passing the output of comparator 17 through the absolute value circuit consisting of an operational amplifier or the like, for example, it is possible to detect the above-mentioned instant when the output passes through "0" irrespective of the sign of $\Delta x$. This "0" signal resets the flip-flop 16 and closes the analog switch 12, thereby changing over the control to linear control. The above-mentioned operation enables a change-over to linear control always under the optimum conditions irrespective of the magnitude of $\Delta x$ and thus solves the problem encountered in the afore-mentioned embodiment.

In the above-mentioned two embodiments, the object of the invention is accomplished by equivalently increasing the position feedback gain. If the shortening of the control time is not a requirement, it is also possible more simply to make the start at a constant control signal $\pm T$ in consideration of the sign of the position deviation $\Delta x$. It is further possible to make the start always at a constant control signal $\pm T$ by neglecting the sign.

As described above, in a positioning control system for positioning an object to be controlled to a desired position using a servo system, the present invention makes it possible to improve the positioning accuracy by actuating the servo motor system in accordance with the position deviation with respect to the desired position before control by means of a control signal which is greater than a control signal given by position feedback which can be stable in the servo system when the position deviation is smaller than a predetermined value and thereafter changing to a servo system which is actuated by the position feedback gain. Incidentally, the present invention can be adapted not only to the closed loop linear positioning control used for the explanation of the above-mentioned embodiments but also to positioning control systems in general which control an object to be controlled to a target position by the use of the servo system. It is also to be noted than an object to be controlled is not particularly limited to the movable table employed in the afore-mentioned embodiments, and the definite numeric values and circuits used therein are not of a limitative nature and can be selected suitably in accordance with given conditions.

Further, it goes without saying that the present invention can be adapted to various devices in which high precision positioning of a movable table, such as a stage or a table, is requisite, besides the afore-mentioned step-and-repeat camera and step-and-repeat projection printing apparatus.

While I have shown and described several embodiments in accordance with the present invention, it is to be understood that the same is not limited thereto but is susceptible of numerous changes and modifications as are known to those of ordinary skill in the art, and I therefore do not wish to be limited to the details shown and described herein but intend to cover all such changes and modifications as are obvious to one skilled in the art.

What is claimed is:

1. A positioning control system for positioning an object at a desired target position by use of a servo system comprising: means for measuring the present position of said object; means for calculating the position deviation between the present position and the desired target position of said object and for generating a control signal representing said position deviation including means for comparing the position deviation with a predetermined value; a servo system including variable gain servo means for moving said object to the desired target position in response to said control signal on the basis of a first value of position feedback gain, when the position deviation is greater than said predetermined value; and control means for initially increasing the gain of said servo means to a second value to provide a control signal greater than the control signal provided by said first value of position feedback gain when said position deviation is smaller than said predetermined value and for thereafter changing the gain of said servo means back to said first value to position said object at the desired target position.

2. A positioning control system as defined in claim 1 wherein said servo means includes an operational amplifier having a variable impedance feedback path, and wherein said control means includes switch control means responsive to said calculating means for changing the impedance of said feedback path of said operational amplifier from a first value to a second value and for changing said impedance back to said first value after a preselected period of time.

3. A positioning control system as defined in claim 2 wherein said switch control means comprises a monostable multivibrator which is set by said calculating means when said position deviation is less than a predetermined value and an analog switch connected in said feedback path of said operational amplifier for operation by said monostable multivibrator.

4. A positioning control system as defined in claim 1 wherein said measuring means comprises a laser interferometric measuring instrument.

5. A positioning control system as defined in claim 4 wherein said servo system comprises a servomotor for moving said object, an operational amplifier having a variable impedance feedback path and being connected to receive said control signal, a tacho-generator connected to said servomotor, and means for controlling said servomotor on the basis of the outputs of said operational amplifier and said tacho-generator.

6. A positioning control system as defined in claim 5 wherein said control means includes a monostable multivibrator which is set by said calculating means when said position deviation is less than said predetermined value and an analog switch connected in said feedback path of said operational amplifier to open said feedback path when said multivibrator is set and to close said feedback path when said multivibrator becomes reset.

7. A positioning control system as defined in claim 5 wherein said control means includes a flip-flop which is set by said calculating means when said position deviation is less than said predetermined value, an analog switch connected in said feedback path of said operational amplifier for operation upon setting of said flip-flop, and detection means for detecting when the output of said tacho-generator reaches a value equal to the output of said operational amplifier which would have been obtained if the gain thereof had been maintained at said first value and for resetting said flip-flop in response thereto.

8. A positioning control system as defined in claim 7 wherein said detection means includes a second operational amplifier having the same characteristics as said first-mentioned operational amplifier with a feedback gain of said first value and being connected to receive said control signal, and comparator means for comparing the output of said tacho-generator with the output of said operational amplifier and for resetting said flip-flop upon detecting when said outputs become equal in absolute value.

9. In a positioning control system for moving an object from a starting position to a target position including a servo system having a predetermined feedback gain of the type in which a control signal to a servo motor for driving the object is proportional to the position deviation with respect to the desired target position, the improvement comprising means for calculating when the position deviation between the starting position of the object and the target position is less than a predetermined value and control means responsive to said calculating means for initially increasing the gain of said servo system above said predetermined feedback gain as the object is moved from said starting position and then reducing the gain to said predetermined value prior to the object reaching said target position.

10. A positioning control system as defined in claim 9 wherein said control means includes means for increasing the gain of said servo system for a preselected period of time.

11. A positioning control system as defined in claim 9 wherein said control means includes means for increasing the gain of said servo system until the velocity of said object reaches a value on the linear velocity characteristic determined by said predetermined feedback gain.

* * * * *